United States Patent
Peter et al.

(10) Patent No.: US 10,488,085 B2
(45) Date of Patent: Nov. 26, 2019

(54) THERMOELECTRIC ENERGY STORAGE SYSTEM AND AN ASSOCIATED METHOD THEREOF

(71) Applicant: General Electric Company, Schenectady, NY (US)

(72) Inventors: Andrew Maxwell Peter, Saratoga Springs, NY (US); Douglas Carl Hofer, Clifton Park, NY (US); Roger Allen Shisler, Ballston Spa, NY (US); Chiranjeev Kalra, Pasadena, CA (US); Andrew Paul Mann, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 44 days.

(21) Appl. No.: 15/603,599

(22) Filed: May 24, 2017

(65) Prior Publication Data
US 2018/0340712 A1    Nov. 29, 2018

(51) Int. Cl.
*F25B 25/00* (2006.01)
*F25B 9/00* (2006.01)

(52) U.S. Cl.
CPC ............ *F25B 25/005* (2013.01); *F25B 9/008* (2013.01)

(58) Field of Classification Search
CPC ........ F25B 9/008; F25B 11/02; F25B 25/005; F25B 2400/24
See application file for complete search history.

(56) References Cited

U.S. PATENT DOCUMENTS

| | | |
|---|---|---|
| 4,765,143 A | 8/1988 | Crawford et al. |
| 6,052,997 A | 4/2000 | Rosenblatt |

(Continued)

FOREIGN PATENT DOCUMENTS

| | | |
|---|---|---|
| CN | 205047261 U | 2/2016 |
| EP | 2532843 A1 | 12/2012 |
| WO | 2012049086 A1 | 4/2012 |

OTHER PUBLICATIONS

Tamme et al., "Advanced Thermal Energy Storage Technology for Parabolic Trough", ASME 2003 International Solar Energy Conference, Paper No. ISEC2003-44033, Mar. 15-18, 2003, pp. 563-571.

(Continued)

*Primary Examiner* — Marc E Norman
(74) *Attorney, Agent, or Firm* — Armstrong Teasdale LLP (57) ABSTRACT

Thermoelectric energy storage system and an associated method are disclosed. The thermoelectric energy storage system includes a first refrigeration system, a power system, a first thermal storage unit, and a second thermal storage unit. The first refrigeration system includes a first heat exchanger, a first compressor, a second heat exchanger, and a first expander. The first heat exchanger is disposed upstream relative to the first compressor. The power system includes a third heat exchanger, a second compressor, a fourth heat exchanger, a fifth heat exchanger, and a second expander. The third heat exchanger is disposed upstream relative to the fourth heat exchanger. The fifth heat exchanger is disposed downstream relative to the second expander. The first thermal storage unit is coupled to the first heat exchanger and the fifth heat exchanger. The second thermal storage unit is coupled to the first refrigeration system and the power system.

20 Claims, 7 Drawing Sheets

(56) References Cited

U.S. PATENT DOCUMENTS

| | | |
|---|---|---|
| 8,739,512 B2 | 6/2014 | Mills |
| 9,038,390 B1* | 5/2015 | Kreuger .................. F01K 23/02 |
| | | 60/655 |
| 9,322,295 B2 | 4/2016 | Pang et al. |
| 2007/0220889 A1 | 9/2007 | Nayef et al. |
| 2012/0080168 A1* | 4/2012 | Hemrle ..................... F01K 3/12 |
| | | 165/104.19 |
| 2014/0060051 A1* | 3/2014 | Ohler ........................ F01K 3/12 |
| | | 60/652 |
| 2014/0102073 A1 | 4/2014 | Pang et al. |
| 2015/0129158 A1 | 5/2015 | Hemrle et al. |
| 2015/0260463 A1 | 9/2015 | Laughlin et al. |
| 2015/0276326 A1* | 10/2015 | Guidati ..................... F01K 3/12 |
| | | 165/10 |
| 2016/0024973 A1 | 1/2016 | Rosenfeld et al. |
| 2016/0146061 A1 | 5/2016 | Kalra et al. |

OTHER PUBLICATIONS

Wright et al., "Bulk Energy Storage using a Supercritical CO2 Waste Heat Recovery Power Plant", The 4th International Symposium—Supercritical CO2 Power Cycles, pp. 1-14, http://www.swri.org/4org/d18/sco2/papers2014/systemConcepts/84-Wright.pdf, Sep. 9-10, 2014, 14 Pages.

* cited by examiner

THERMOELECTRIC ENERGY STORAGE SYSTEM AND AN ASSOCIATED METHOD THEREOF

This disclosure was made with Government support under contract number DE-AR0000467 awarded by U.S. Department of Energy. The Government has certain rights in the disclosure.

BACKGROUND

Embodiments of the present invention relate generally to energy storage systems and more particularly to a thermoelectric energy storage system and an associated method thereof.

Energy storage systems, such as electrical energy storage systems may use a charge cycle for storing energy and a discharge cycle for retrieval of the stored energy. In a thermoelectric energy storage system, during the charge cycle, a compressor is driven using electric power to compress a fluid and store the energy in a compressed fluid. Further, during the discharge cycle, the compressed fluid is expanded using a turbo expander to drive a generator for retrieval of the stored energy. However, such energy storage systems may require access to underground caverns for retaining pressure of the compressed fluid, which may not be economical and thus may be of limited deployment.

Further, certain other thermal energy storage systems may store solar energy in molten salt during the charge cycle. During discharge cycle, such thermal energy storage systems may retrieve the thermal energy by generating a vaporized working fluid from the molten salt, expand the vaporized working fluid, and generate electric energy. However, performance of thermodynamic cycles in the charge cycle and discharge cycle are limited by temperature constraints and available thermal sources. For example, during the discharge cycle, the heat exchange between working fluid and the thermal source are limited by a temperature difference between hot and cold sides of a heat exchanger. Typically, the difference in the temperature between the working fluid and the thermal source may be significant, and thereby reduce efficiency of the discharge cycle. Similarly, during a refrigeration-based charge cycle, the temperature of the working fluid in a condenser is limited by temperature of ambient air being used to cool the working fluid. Typically, a warmer ambient air may lead to generation of warmer working fluid from the condenser, and thereby reduce coefficient of performance of the charge cycle.

Thus, there is a need for an improved energy storage system and an associated method.

BRIEF DESCRIPTION

In accordance with one exemplary embodiment of the disclosed technique, a thermoelectric energy storage system is disclosed. The thermoelectric energy storage system includes a first refrigeration system, a power system, a first thermal storage unit, and a second thermal storage unit. The first refrigeration system includes a first heat exchanger, a first compressor, a second heat exchanger, and a first expander. The first heat exchanger is disposed upstream relative to the first compressor and downstream relative to the first expander. The second heat exchanger is disposed downstream relative to the first compressor and upstream relative to the first expander. The power system includes a third heat exchanger, a second compressor, a fourth heat exchanger, a fifth heat exchanger, and a second expander. The third heat exchanger is disposed downstream relative to the second compressor and upstream relative to the fourth heat exchanger. The fourth heat exchanger is disposed upstream relative to the second expander and coupled to a heat source. The fifth heat exchanger is disposed downstream relative to the second expander and upstream relative to the second compressor. The first thermal storage unit is coupled to the first heat exchanger and the fifth heat exchanger. The second thermal storage unit is coupled to the first refrigeration system and the power system.

In accordance with another exemplary embodiment of the disclosed technique, a thermoelectric energy storage system is disclosed. The thermoelectric energy storage system includes a first refrigeration system, a second refrigeration system, a thermal storage unit, and a power system. The thermal storage unit includes a cold storage unit, an intermediate storage unit, and a hot storage unit. The cold storage unit, the intermediate storage unit, and the hot storage unit are coupled to each other via first circulation paths extending through the first refrigeration system and the second refrigeration system. The hot storage unit, the intermediate storage unit, and the cold storage unit are coupled to each other via a second circulation path extending through the power system.

In accordance with yet another exemplary embodiment of the disclosed technique, a method for operating a thermoelectric energy storage system is disclosed is disclosed. The method involves circulating a first fluid in a first refrigeration system to generate first thermal energy. The method further involves circulating a second fluid from a first thermal storage unit in heat exchange relationship with the first fluid to store a first quantity of the first thermal energy in the second fluid. Further, the method involves circulating a third fluid from a second thermal storage unit in heat exchange relationship with the first fluid to store a second quantity of the first thermal energy in the third fluid. The method further involves circulating a fourth fluid in a power system and circulating the second fluid from the first thermal storage unit in heat exchange relationship with the fourth fluid circulated in the power system, to retrieve the first quantity of the first thermal energy stored in the second fluid. Further, the method involves circulating the third fluid from the second thermal storage unit in heat exchange relationship with the fourth fluid circulated in the power system, to retrieve the second quantity of the first thermal energy stored in the third fluid. The method further involves providing second thermal energy to the fourth fluid circulated in the power system, using a heat source, to increase temperature of the fourth fluid, and expanding the fourth fluid in the power system for generating electric power.

DRAWINGS

These and other features and aspects of embodiments of the disclosed technique will become better understood when the following detailed description is read with reference to the accompanying drawings in which like characters represent like parts throughout the drawings, wherein.

DETAILED DESCRIPTION

Embodiments discussed herein disclose a thermoelectric energy storage system including a refrigeration system, a power system, a first thermal storage unit, and a second thermal storage unit. In certain embodiments, the thermoelectric energy storage system is configured to efficiently store a portion of thermal energy in the second thermal storage unit (hereinafter also referred to as an "intermediate thermal storage unit") while operating the refrigeration system. Further, the thermoelectric energy storage system is configured to retrieve the portion of the thermal energy from the intermediate thermal storage unit while operating the power system. In certain embodiments, the refrigeration and power systems are operated in a time-shift arrangement. In other words, the refrigeration and power systems are operated alternately. For example, the refrigeration system may be operated during night, when a demand for electric power is lower, and the power system may be operated during day, when the demand for the electric power is higher.

In one embodiment, a first fluid is circulated in the refrigeration system, a second fluid is circulated in the first thermal storage unit, a third fluid is circulated in the second thermal storage unit, and a fourth fluid is circulated in the power system. In certain embodiments, the first, second, and fourth fluids are same. In such an embodiment, the first, second, the fourth fluids may include a multiphase transcritical carbon dioxide ($CO_2$). The third fluid may include water or glycol or thermal oil or a phase change material.

Figure 1:
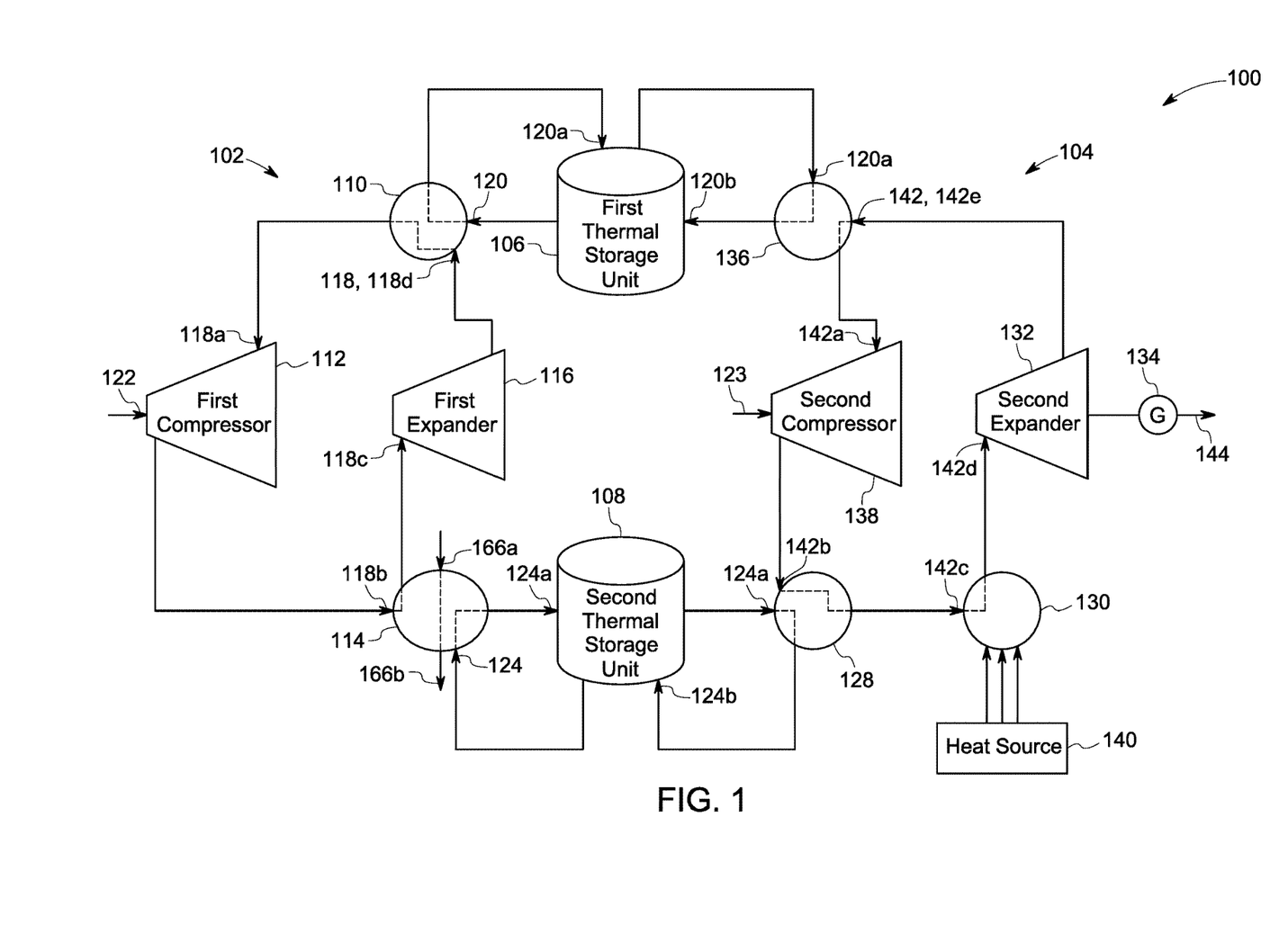
FIG. 1 illustrates a block diagram of a thermoelectric energy storage system in accordance with one exemplary embodiment.

FIG. 1 represents a block diagram of a thermoelectric energy storage system 100 in accordance with one exemplary embodiment. In certain embodiments, the thermoelectric energy storage system 100 includes a refrigeration system 102 (also referred to as a "first refrigeration system"), a power system 104, a first thermal storage unit 106, and a second thermal storage unit 108.

The refrigeration system 102 includes a first heat exchanger 110, a first compressor 112, a second heat exchanger 114, and a first expander 116. The first heat exchanger 110 is disposed upstream relative to the first compressor 112 and downstream relative to the first expander 116. The second heat exchanger 114 is disposed downstream relative to the first compressor 112 and upstream relative to the first expander 116. During operation, a first fluid 118 is circulated in the refrigeration system 102 to generate first thermal energy. In the illustrated embodiment, the refrigeration system 102 is a closed loop system.

The first heat exchanger 110 is in fluid communication with the first thermal storage unit 106. Specifically, the first heat exchanger 110 is in a heat exchange relationship with the first thermal storage unit 106 such that the first fluid 118 circulated in the refrigeration system 102 is used to exchange heat with a second fluid 120 circulated from the first thermal storage unit 106. In one embodiment, the first fluid 118 and the second fluid 120 are different. For example, in one embodiment, the first fluid 118 may be carbon dioxide ($CO_2$) and the second fluid 120 may be water. In some other embodiments, the first fluid 118 and the second fluid 120 may be substantially same, for example, $CO_2$. In such an embodiment, the first thermal storage unit 106 and the first heat exchanger 110 may be integrated to each other to form a signal component, and thereby allow mixing of the first fluid 118 with the second fluid 120. During operation, the first heat exchanger 110 is used to increase temperature of the first fluid 118 by exchanging heat with the second fluid 120, and thereby produce a hot first fluid 118a and a cold second fluid 120a. The cold second fluid 120a having substantially lower temperature compared to the second fluid 120 is circulated back to the first thermal storage unit 106. In one or more embodiments, the circulation of the second fluid 120 in heat exchange relationship with the first fluid 118 may result in storing a first quantity of the first thermal energy in the cold second fluid 120a. In certain embodiments, the first fluid 118 may undergo a phase change from a mixed phase state to a gaseous state in the first heat exchanger 110. It should be noted herein that the term "mixed phase state" is referred to as a mixture of a gaseous stream and a liquid stream of the first fluid 118.

The first compressor 112 is driven using electric energy 122. In certain embodiments, the electric energy 122 may be surplus energy, which is available when the demand for the electric energy 122 is lower. The first compressor 112 is used to receive the hot first fluid 118a from the first heat exchanger 110 and increase pressure of the hot first fluid 118a and thereby generate a compressed first fluid 118b. In one embodiment, the compressed first fluid 118b has a substantially higher temperature and pressure in comparison to the hot first fluid 118a.

Further, the refrigeration system 102 is in fluid communication with the second thermal storage unit 108. In the illustrated embodiment, the second heat exchanger 114 of the refrigeration system 102 is in fluid communication with the second thermal storage unit 108. Specifically, the second heat exchanger 114 is in a heat exchange relationship with the second thermal storage unit 108 such that the compressed first fluid 118b in the refrigeration system 102 is circulated in heat exchange relationship with a third fluid 124 fed from the second thermal storage unit 108. Further, ambient air 166a or water is fed via the second heat exchanger 114. In one embodiment, the first fluid 118 and the third fluid 124 are different. For example, the first fluid 118 is $CO_2$ and the third fluid 124 is water. In some other embodiments, the third fluid 124 may include glycol or thermal oil or a phase change material. During operation, the second heat exchanger 114 is used to reduce temperature of the compressed first fluid 118b by exchanging heat with the third fluid 124, and thereby generate a cold first fluid 118c and hot third fluid 124a. In the illustrated embodiment, the second heat exchanger 114 is a condenser. The circulation of the third fluid 124 in heat exchange relationship with the compressed first fluid 118b results in storing a second quantity of the first thermal energy in the hot third fluid 124a. The compressed first fluid 118b undergoes a phase change from the gaseous state to the liquid state in the second heat exchanger 114. The hot third fluid 124a is circulated back to the second thermal storage unit 108. Specifically, the hot third fluid 124a is stored in a separate storage unit of the second thermal storage unit 108. The ambient air 166a flows through the second heat exchanger 114, thereby cooling the compressed first fluid 118b. Hot air 166b is generated from the second heat exchanger 114. In the illustrated embodiment, the refrigeration system 102 uses the third fluid 124 as a primary heat extraction source and the ambient air 166a as a secondary heat extraction source.

The first expander 116 is used to receive the cold first fluid 118c from the second heat exchanger 114 and expand the cold first fluid 118c to produce an expanded first fluid 118d. It should be noted herein that the expanded first fluid 118d may also be referred to as the first fluid 118. In one embodiment, the expanded first fluid 118d includes a mixture of gaseous $CO_2$ and liquid $CO_2$. In one embodiment, the expanded first fluid 118d has a substantially low pressure and temperature compared to the cold first fluid 118c. In some embodiments, the first expander 116 may be a throttling valve.

In certain embodiments, the refrigeration system 102 is used to operate continuously either during night or day by using electric energy 122 and thereby store the first quantity of the thermal energy in the cold second fluid 120a and the second quantity of the thermal energy in the hot third fluid 124a. In such embodiments, the first thermal storage unit 106 is used to store the cold second fluid 120a and the second thermal storage unit 108 is used to store the hot third fluid 124a.

The power system 104 includes a third heat exchanger 128, a fourth heat exchanger 130, a second expander 132, a generator 134, a fifth heat exchanger 136, and a second compressor 138. The third heat exchanger 128 is disposed downstream relative to the second compressor 138 and upstream relative to the fourth heat exchanger 130. The fourth heat exchanger 130 is disposed upstream relative to the second expander 132 and coupled to a heat source 140. The fifth heat exchanger 136 is disposed downstream relative to the second expander 132 and upstream relative to the second compressor 138. During operation, a fourth fluid 142 is circulated in the power system 104 to retrieve the stored first thermal energy. In the illustrated embodiment, the power system 104 is a closed loop system.

The fifth heat exchanger 136 is in fluid communication with the first thermal storage unit 106. Specifically, the fifth heat exchanger 136 is in a heat exchange relationship with the first thermal storage unit 106 such that the fourth fluid 142 circulated in the power system 104 is used to exchange heat with the second fluid 120 circulated from the first thermal storage unit 106. In one embodiment, the fourth fluid 142 and the second fluid 120 are different. For example, in one embodiment, the fourth fluid 142 is carbon dioxide ($CO_2$) and the second fluid 120 is water. In some other embodiments, the fourth fluid 142 and the second fluid 120 are substantially same, for example, $CO_2$. In such an embodiment, the first thermal storage unit 106 and the fifth heat exchanger 136 may be integrated to each other to form a signal component, thereby allow mixing of the fourth fluid 142 with the second fluid 120. During operation, the fifth heat exchanger 136 is used to decrease temperature of the fourth fluid 142 by exchanging heat with the cold second fluid 120a, thereby generate a cold fourth fluid 142a and a hot second fluid 120b. In the illustrated embodiment, the fifth heat exchanger 136 is a condenser. The hot second fluid 120b is circulated back to the first thermal storage unit 106. In certain embodiments, the hot second fluid 120b may be mixed with the cold second fluid 120a stored in the first thermal storage unit 106 to produce the second fluid 120.

The circulation of the cold second fluid 120a in heat exchange relationship with the fourth fluid 142 results in retrieving the first quantity of the first thermal energy from the cold second fluid 120a. The fourth fluid 142 undergoes a phase change from a gaseous state to a liquid state within the fifth heat exchanger 136.

The second compressor 138 is driven using electric energy 123. The second compressor 138 is a liquid pump, used to receive the cold fourth fluid 142a from the fifth heat exchanger 136 and increase pressure of the cold fourth fluid 142a, thereby generating a compressed fourth fluid 142b. In one embodiment, the compressed fourth fluid 142b has a substantially high pressure compared to the cold fourth fluid 142a. In one embodiment, compressed fourth fluid 142b has a pressure greater than the critical pressure of the fourth fluid 142.

The power system 104 is in fluid communication with the second thermal storage unit 108. In the illustrated embodiment, the third heat exchanger 128 of the power system 104 is in fluid communication with the second thermal storage unit 108. Specifically, the third heat exchanger 128 is in a heat exchange relationship with the second thermal storage unit 108 such that the compressed fourth fluid 142b is circulated in heat exchange relationship with the third fluid 124 circulated from the second thermal storage unit 108. Specifically, the hot third fluid 124a is circulated in heat exchange relationship with the compressed fourth fluid 142b to generate a supercritical fourth fluid 142c. In one embodiment, the fourth fluid 142 and the third fluid 124 are different. For example, in one embodiment, the fourth fluid 142 is $CO_2$ and the third fluid 124 is water. During operation, the third heat exchanger 128 is used to further increase temperature of the compressed fourth fluid 142b by exchanging heat with the hot third fluid 124a, thereby generate the supercritical fourth fluid 142c and a cold third fluid 124b. In one or more embodiments, the circulation of the third fluid 124 in heat exchange relationship with the compressed fourth fluid 142b results in retrieving the second quantity of the first thermal energy from the hot third fluid 124a. In one embodiment, the supercritical fourth fluid 142c may undergo a transcritical change from a liquid state to a supercritical state in the third heat exchanger 128. The cold third fluid 124b is circulated back to the second thermal storage unit 108. Specifically, the cold third fluid 124b may be stored in a separate storage unit of the second thermal storage unit 108.

The fourth heat exchanger 130 is coupled to the heat source 140. In certain embodiments, the heat source 140 may be a gas burner, an oil burner, waste heat stream, exhaust stream, molten salt stream, a solar heater, or the like. The fourth heat exchanger 130 is in a heat exchange relationship with the heat source 140 such that the supercritical fourth fluid 142c is further heated up for generating a hot supercritical fourth fluid 142d.

The second expander 132 is used to receive the hot supercritical fourth fluid 142d from the fourth heat exchanger 130 and expand the hot supercritical fourth fluid 142d to produce an expanded fourth fluid 142e. It should be noted herein that the expanded fourth fluid 142e may also be referred to as the fourth fluid 142. In one embodiment, the expanded fourth fluid 142e has a substantially lower pressure and temperature compared to the hot supercritical fourth fluid 142d. The second expander 132 is further coupled to the generator 134 and used to drive the generator 134 to generate electric power 144.

In certain embodiments, the power system 104 is used to continuously operate either during night or day, thereby retrieving the first quantity of the thermal energy from the cold second fluid 120a and the second quantity of the thermal energy from the hot third fluid 124a. In certain embodiments, the refrigeration system 102 and the power system 104 are used to operate in a time-shift arrangement, thereby allowing to optimally handle the electric energy 122.

Figure 2:
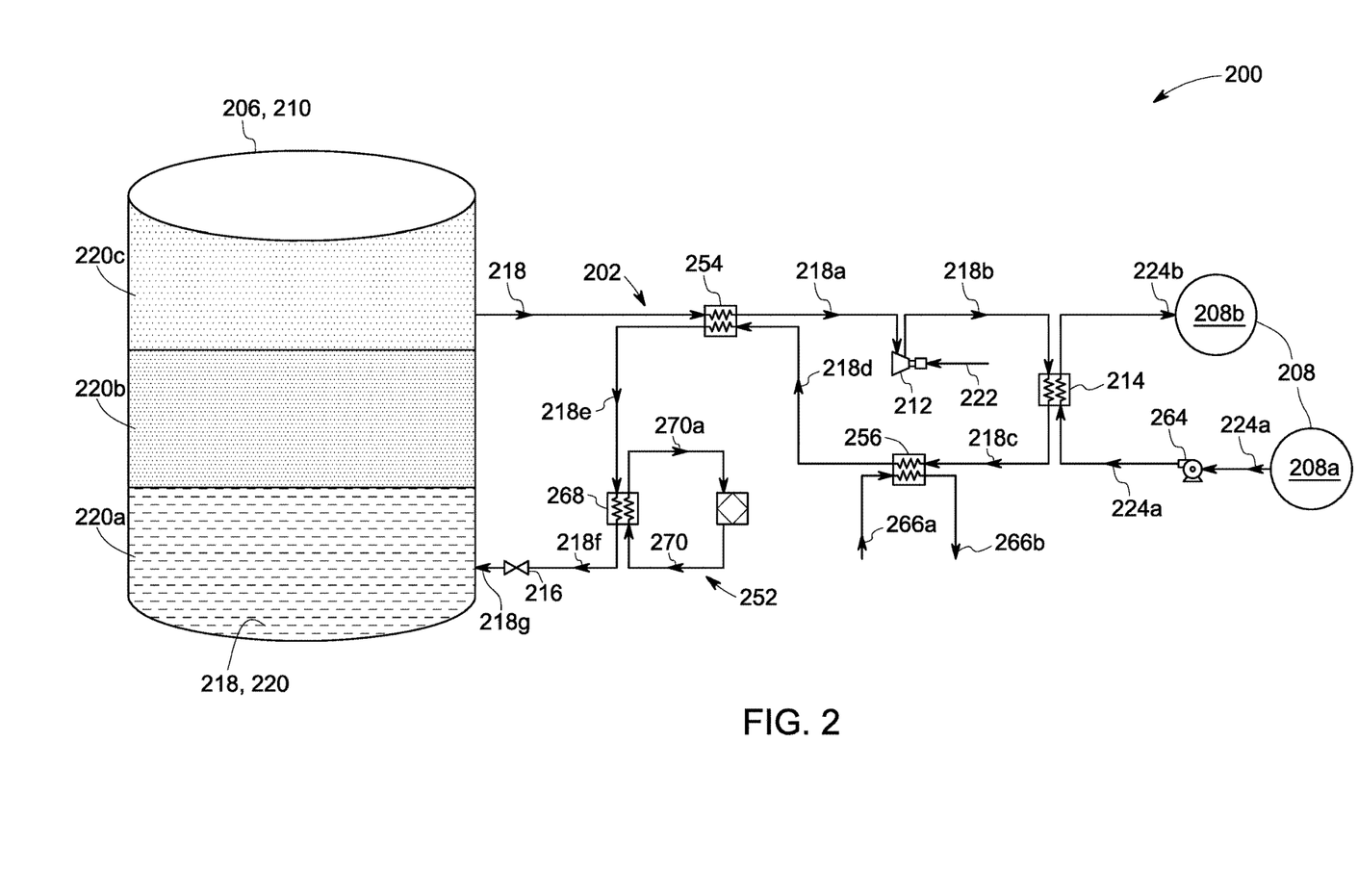
FIG. 2 illustrates a block diagram of a thermoelectric energy storage including a first refrigeration system and a portion of a second refrigeration system in accordance with another exemplary embodiment.

FIG. 2 illustrates a block diagram of a thermoelectric energy storage system 200 in accordance with another exemplary embodiment. The thermoelectric energy storage system 200 includes a first refrigeration system 202, a second refrigeration system 252, a first thermal storage unit 206, a portion of a second thermal storage unit 208.

In one embodiment, the first refrigeration system 202 includes a first heat exchanger 210, a recuperator 254, a first compressor 212, a second heat exchanger 214, an air cooler 256, and a first expander 216. In the illustrated embodiment, the first thermal storage unit 206 and the first heat exchanger 210 are integrated to each other as a signal component. In such an embodiment, a first fluid 218 circulated in the first refrigeration system 202 and a second fluid 220 stored in the first thermal storage unit 206 are substantially same. In one embodiment, the first fluid 218 and the second fluid 220 are carbon dioxide ($CO_2$).

In one embodiment, the first thermal storage unit 206 is a triple point storage tank used to store both solid $CO_2$ stream 220a (herein after also referred to as a "dry ice") and liquid $CO_2$ stream 220b at the triple point of the $CO_2$. Further, the first thermal storage unit 206 is also used to store vaporized $CO_2$ stream 220c, which may have formed by the evaporation of the solid $CO_2$ stream 220a with liquid $CO_2$ stream 220b. The solid $CO_2$ stream 220a and the liquid $CO_2$ stream 220b are shown as two different layers for illustration purpose only and such an illustration should not be construed as a limitation of the present disclosure. In some embodiments, the solid $CO_2$ stream 220a and the liquid $CO_2$ stream 220b may be intermixed with each other to form a slush or slurry of the $CO_2$ stream. In thermodynamics, the triple point of any substance is referred to as a temperature and a pressure at which the three phases of the substance coexist in thermodynamic equilibrium. In one embodiment, the liquid $CO_2$ stream 220b is formed only at pressures above 5.1 atmospheres, and the triple point of $CO_2$ is at about 518 kilopascal at −56.65 degree centigrade.

The vaporized $CO_2$ stream 220c is circulated from the first thermal storage unit 206 as the first fluid 218 (i.e., gaseous $CO_2$ stream) in the first refrigeration system 202. The removal of vaporized $CO_2$ stream 220c from an uppermost region of the first thermal storage unit 206 causes the evaporation of liquid $CO_2$ stream 220b, thereby lowering the temperature of the first thermal storage unit 206 until it reaches the triple point of the $CO_2$ at about 75 pounds per square inch (psia) and −70 degrees Fahrenheit. At that stage, crystals of solid $CO_2$ stream 220a starts forming at an interface area between the vapor-liquid $CO_2$ streams 220c, 220b and begin to slowly increase in size, with about 1.3 pounds of solid $CO_2$ stream 220a being formed for every pound of liquid $CO_2$ stream 220b that is vaporized.

The recuperator 254 is coupled to the first thermal storage unit 206 and the air cooler 256. The recuperator 254 is used to receive the first fluid 218 i.e., the gaseous $CO_2$ stream from the first thermal storage unit 206 and a first cool vapor $CO_2$ stream 218d from the air cooler 256. The recuperator 254 is used to exchange heat between the first fluid 218 i.e., the gaseous $CO_2$ stream and the first cool vapor $CO_2$ stream 218d, and thereby generate a hot gaseous $CO_2$ stream 218a and a second cool vapor $CO_2$ stream 218e.

The first compressor 212 is coupled to the recuperator 254, disposed downstream relative to the recuperator 254, and is driven using electric power 222. In one embodiment, the first compressor 212 is used to receive the hot gaseous $CO_2$ stream 218a and increase pressure of the hot gaseous $CO_2$ stream 218a, to generate a compressed gaseous $CO_2$ stream 218b.

The second heat exchanger 214 is coupled to the first compressor 212 and disposed downstream relative to the first compressor 212. Further, the second heat exchanger 214 is in fluid communication with an intermediate storage unit 208a of the second thermal storage unit 208 and the first compressor 212. The second heat exchanger 214 is used to reduce temperature of the compressed gaseous $CO_2$ stream 218b by exchanging heat with an intermediate third fluid 224a, and thereby generate a cold vapor $CO_2$ stream 218c and a hot third fluid 224b. In one embodiment, the hot third fluid 224b is fed into a hot storage unit 208b of the second thermal storage unit 208. In the illustrated embodiment, the second thermal storage unit 208 includes a first liquid pump 264 used to pump the intermediate third fluid 224a from the intermediate storage unit 208a to the second heat exchanger 214. In the illustrated embodiment, the circulation of the intermediate third fluid 224a in heat exchange relationship with the compressed gaseous $CO_2$ stream 218b results in storing a second quantity of the first thermal energy in the hot third fluid 224b. In one embodiment, the intermediate third fluid 224a is water.

The air cooler 256 is coupled to the second heat exchanger 214 and disposed downstream relative to the second heat exchanger 214. The air cooler 256 is used to receive the cold vapor $CO_2$ stream 218c from the second heat exchanger 214 and ambient air 266a. The air cooler 256 is used to exchange heat between the cold vapor $CO_2$ stream 218c and the ambient air 266a, and thereby generate the first cool vapor $CO_2$ stream 218d and hot air 266b. The hot air 266b is discharged to atmosphere. As discussed earlier, the recuperator 254 is used to exchange heat between the first fluid 218 i.e., the gaseous $CO_2$ stream circulated from the first thermal storage unit 206 and the first cool vapor $CO_2$ stream 218d received from the air cooler 256, and thereby generate the hot gaseous $CO_2$ stream 218a and the second cool vapor $CO_2$ stream 218e.

The second refrigeration system 252 is coupled to the first refrigeration system 202. Specifically, the second refrigeration system 252 includes a condenser 268 disposed in a heat exchange relationship with the first refrigeration system 202. A fifth fluid 270, for example, propane is circulated in the second refrigeration system 252. In some other embodiments, the fifth fluid 270 may be ammonia. In the illustrated embodiment, the condenser 268 is used to receive the second cool vapor $CO_2$ stream 218e from the recuperator 254 and the fifth fluid 270 i.e., a liquid propane stream from the second refrigeration system 252. Further, the condenser 268 is used to exchange heat between the second cool vapor $CO_2$ stream 218e and the fifth fluid 270, and thereby generate a third cool liquid $CO_2$ stream 218f and a vapor propane stream 270a. In the illustrated embodiment, circulation of the fifth fluid 270 in heat exchange relationship with the second cool vapor $CO_2$ stream 218e results in transferring a third quantity of the first thermal energy to the vapor propane stream 270a.

The first expander 216 is coupled to the second heat exchanger 214 and used to receive the third cool liquid $CO_2$ stream 218f from the second heat exchanger 214 via the condenser 268 and expand the third cool liquid $CO_2$ stream 218f to generate an expanded third cool liquid $CO_2$ stream 218g. The expanded third cool liquid $CO_2$ stream 218g is discharged to the first thermal storage unit 206. In certain embodiments, the expanded third cool liquid $CO_2$ stream 218g may include a small percentage of the first fluid 218 i.e., the gaseous $CO_2$ stream. In one embodiment, the expanded third cool liquid $CO_2$ stream 218g is completely condensed within the first thermal storage unit 206 to produce the liquid $CO_2$ stream 220b.

Figure 3:
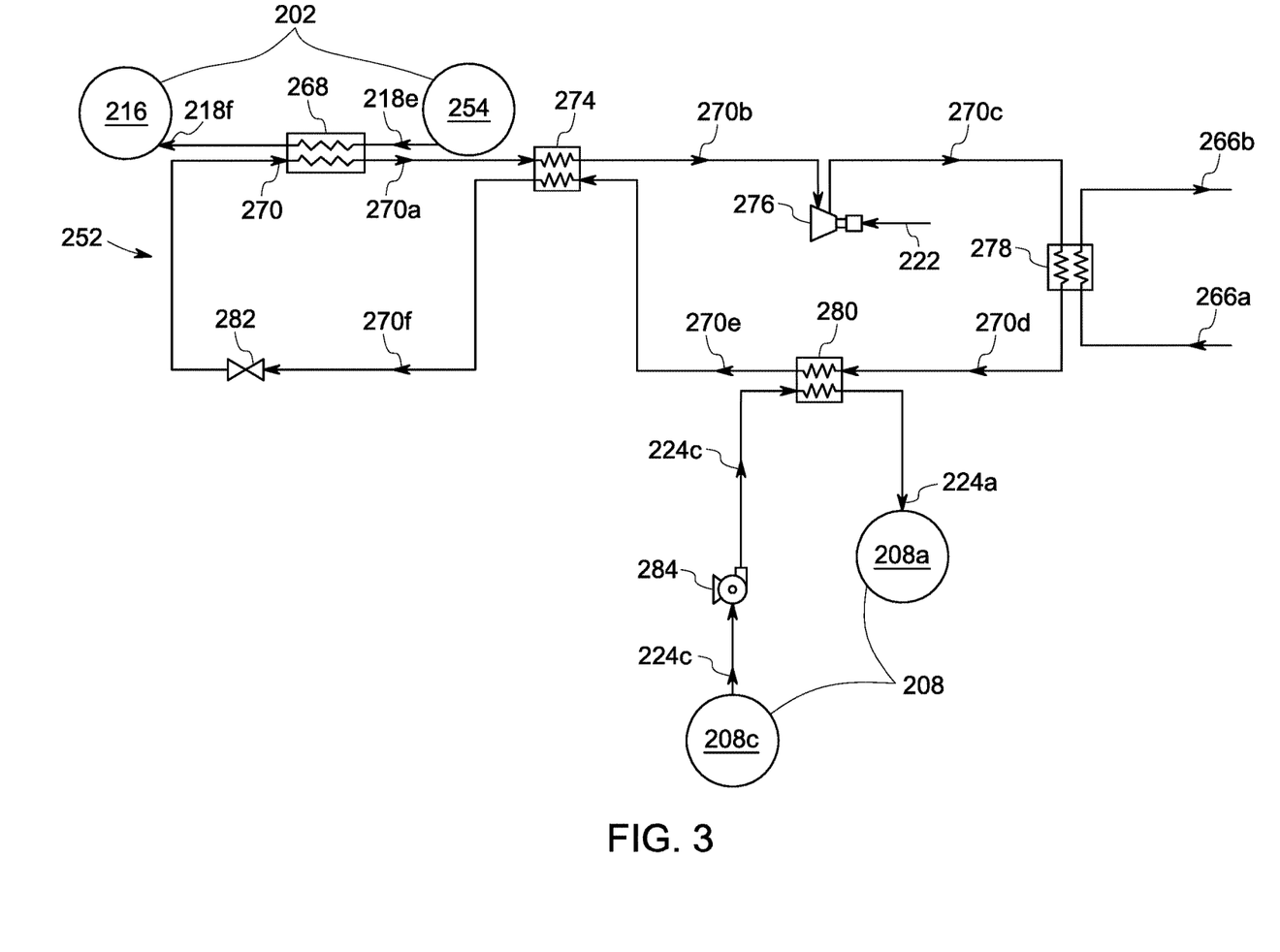
FIG. 3 illustrates a block diagram of the second refrigeration system in accordance with the exemplary embodiment of FIG. 2.

FIG. 3 illustrates a block diagram of the second refrigeration system 252 in accordance with the exemplary embodiment of FIG. 2. The second refrigeration system 252 includes the condenser 268, a recuperator 274, a compressor 276, an air condenser 278, a sixth heat exchanger 280, and an expander 282.

The second refrigeration system 252 is coupled to the first refrigeration system 202 and the second thermal storage unit 208. The first refrigeration system 202 is used to transfer a third quantity of the first thermal energy to the second refrigeration system 252. The second thermal storage unit 208 is used to store the third quantity of the first thermal energy from the second refrigeration system 252.

The condenser 268 is coupled to the recuperator 254 and the expander 282. The condenser 268 is used to receive the second cool vapor $CO_2$ stream 218e from the recuperator 254 and the fifth fluid 270 from the expander 282. Further, the condenser 268 is used to exchange heat between the second cool vapor $CO_2$ stream 218e and the fifth fluid 270, and thereby generate the third cool liquid $CO_2$ stream 218f and the vapor propane stream 270a. In the illustrated embodiment, circulation of the fifth fluid 270 in heat exchange relationship with the second cool vapor $CO_2$ stream 218e results in transferring a third quantity of the first thermal energy to the vapor propane stream 270a.

The recuperator 274 is also coupled to the sixth heat exchanger 280. The recuperator 274 is disposed downstream relative to the condenser 268 and used to receive the vapor propane stream 270a from the condenser 268 and a first cold liquid propane stream 270e from the sixth heat exchanger 280. The recuperator 274 is used to exchanger heat between the vapor propane stream 270a and the first cold liquid propane stream 270e, and thereby generate a hot vapor propane stream 270b and a second cold liquid propane stream 270f.

The compressor 276 is coupled to the recuperator 274 and disposed downstream relative to the recuperator 274. The compressor 276 is used to receive the hot vapor propane stream 270b from the recuperator 274 to increase pressure of the hot vapor propane stream 270b and thereby generate a compressed vapor propane stream 270c. The air condenser 278 is disposed downstream relative to the compressor 276. The compressor 276 is also coupled to the air condenser 278. The air condenser 278 is used to receive the compressed vapor propane stream 270c from the compressor 276 and ambient air 266a. The air cooler 256 is used to exchange heat between the compressed vapor propane stream 270c and the ambient air 266a, and thereby generate a cool liquid propane stream 270d and hot air 266b. In such embodiment, the hot air 266b is discharged to atmosphere.

The second refrigeration system 252 is coupled to the second thermal storage unit 208. Specifically, the second refrigeration system 252 includes the sixth heat exchanger 280 coupled to the second thermal storage unit 208. In the illustrated embodiment, the sixth heat exchanger 280 is further coupled to the air condenser 278. The sixth heat exchanger 280 is used to receive the cool liquid propane stream 270d from the air condenser 278 and a cold third fluid 224c from a cold storage unit 208c of the second thermal storage unit 208. The sixth heat exchanger 280 is used to reduce temperature of the cool liquid propane stream 270d by exchanging heat with the cold third fluid 224c, and thereby generate the first cold liquid propane stream 270e and the intermediate third fluid 224a. In one embodiment, the intermediate third fluid 224a is circulated back to the intermediate storage unit 208a of the second thermal storage unit 208. In the illustrated embodiment, the second thermal storage unit 208 includes a second liquid pump 284 used to pump the cold third fluid 224c from the cold storage unit 208c to the sixth heat exchanger 280. In the illustrated embodiment, the circulation of the cold third fluid 224c in heat exchange relationship with the cool liquid propane stream 270d results in storing a third quantity of the first thermal energy in the intermediate third fluid 224a. The expander 282 is used to receive the second cold liquid propane stream 270f from the recuperator 274 and expand the second cold liquid propane stream 270f to produce the fifth fluid 270.

Figure 4:
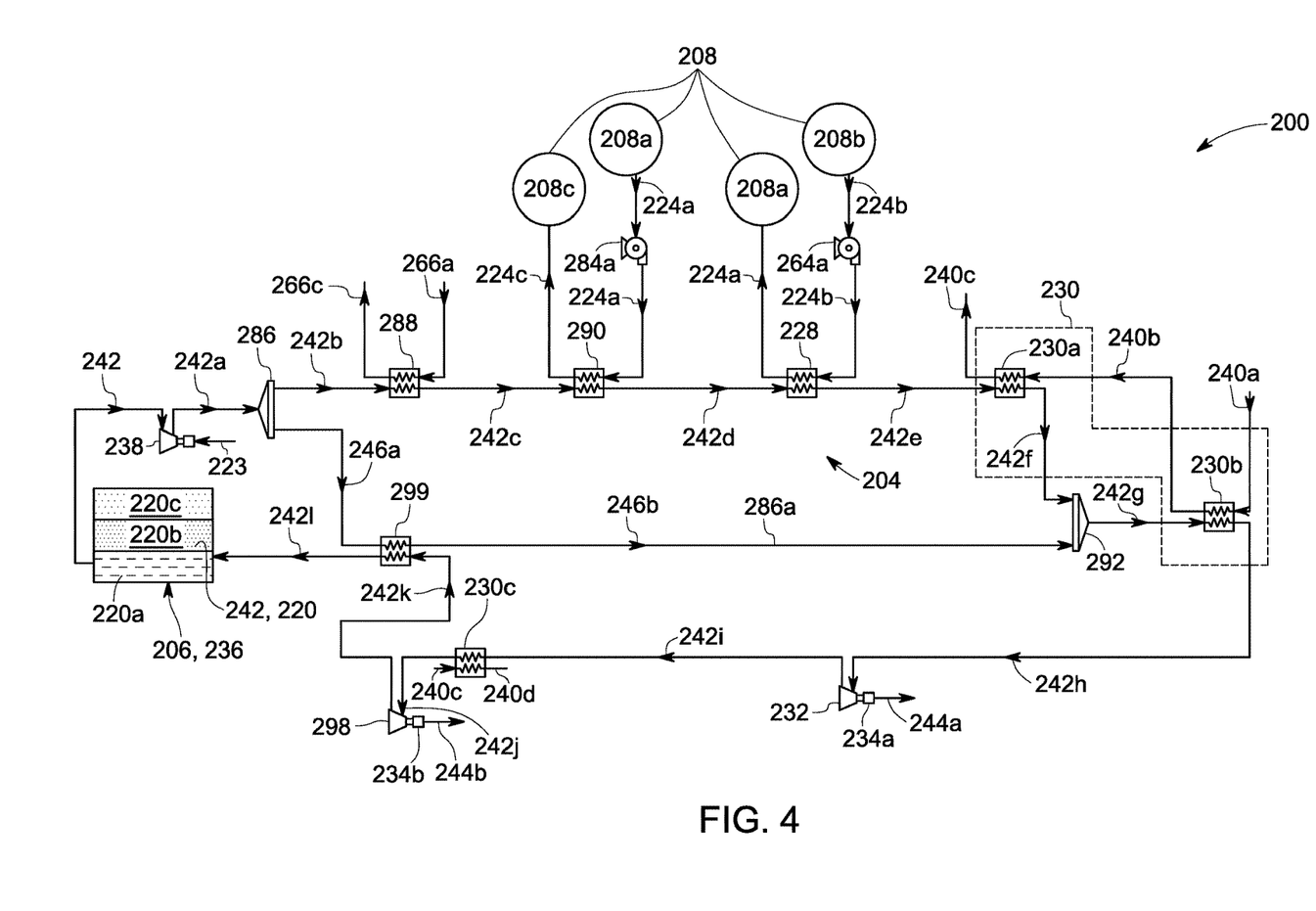
FIG. 4 illustrates a block diagram of the thermoelectric energy storage including a power system in accordance with the exemplary embodiments of FIGS. 2 and 3.

FIG. 4 illustrates a block diagram of the thermoelectric energy storage system 200 including the power system 204 in accordance with the exemplary embodiments of FIGS. 2 and 3.

In one embodiment, the power system 204 includes a second compressor 238, a third heat exchanger 228, a fourth heat exchanger 230, a fifth heat exchanger 236, a second expander 232, and a first generator 234a. The fourth heat exchanger 230 includes a first heater 230a and a second heater 230b. In the illustrated embodiment, the power system 204 further includes a splitter 286, an air cooler 288, a seventh heat exchanger 290, a combining unit 292, a third heater 230c, a third expander 298, a second generator 234b, and a recuperator 299.

In the illustrated embodiment, the first thermal storage unit 206 and the fifth heat exchanger 236 are integrated to each other to form a single component. A fourth fluid 242 circulated in the power system 204 and the second fluid 220 stored in the first thermal storage unit 206 are substantially same. In one embodiment, the fourth fluid 242 and the second fluid 220 are carbon dioxide ($CO_2$).

In one embodiment, condensation of the second fluid 220 i.e., the $CO_2$ stream within the fifth heat exchanger 236 may result in formation of the liquid $CO_2$ stream 220b within the first thermal storage unit 206. In some other embodiments, cooled second expanded gaseous $CO_2$ stream 242l received from the recuperator 299 is cooled to the triple point of $CO_2$ before condensing the cooled second expanded gaseous $CO_2$ stream 242l, thereby melting a portion of the solid $CO_2$ slush to generate additional liquid $CO_2$ stream 220b. The condensation of the second fluid 220 i.e., the $CO_2$ stream may result in retrieving a first quantity of the first thermal energy in the liquid $CO_2$ stream 220b. The liquid $CO_2$ stream 220b is circulated from the first thermal storage unit 206 as the fourth fluid 242 (i.e., cold liquid $CO_2$ stream) in the power system 204.

The second compressor 238 is coupled to the first thermal storage unit 206 and disposed downstream relative to the first thermal storage unit 206. The second compressor 238 is driven using electric power 223. In one embodiment, the second compressor 238 is a liquid pump. In one embodiment, the second compressor 238 is configured to receive the fourth fluid 242 i.e., cold liquid $CO_2$ stream, increase pressure of the fourth fluid 242, and thereby generate a pressurized liquid $CO_2$ stream 242a. The splitter 286 is coupled to the second compressor 238 and disposed downstream relative to the second compressor 238. The splitter 286 is used to split the pressurized liquid $CO_2$ stream 242a into a main pressurized liquid $CO_2$ stream 242b and a bypass pressurized liquid $CO_2$ stream 246a. In one embodiment, the split ratio of the main pressurized liquid $CO_2$ stream 242b and the bypass pressurized liquid $CO_2$ stream 246a is approximately 60:40.

The air cooler 288 is coupled to the splitter 286 and disposed downstream relative to the splitter 286 is used to receive the main pressurized liquid $CO_2$ stream 242b and ambient air 266a. The air cooler 288 is used to heat the main pressurized liquid $CO_2$ stream 242b by exchanging heat from the ambient air 266a, to generate a hot liquid $CO_2$ stream 242c and chilled air 266c. The chilled air 266c is discharged to an inlet of a gas combustion turbine (not shown).

The seventh heat exchanger 290 is coupled to the air cooler 288 and the intermediate storage unit 208a of the second thermal storage unit 208. The seventh heat exchanger 290 is disposed downstream relative to the air cooler 288 and used to receive the hot liquid $CO_2$ stream 242c from the air cooler 288 and the intermediate third fluid 224a from the intermediate storage unit 208a of the second thermal storage unit 208. The seventh heat exchanger 290 is used to exchange heat between the hot liquid $CO_2$ stream 242c and the intermediate third fluid 224a, to generate a hot $CO_2$ stream 242d and a cold third fluid 224c. In such an embodiment, the cold third fluid 224c may be stored in a cold storage unit 208c of the second thermal storage unit 208. In the illustrated embodiment, the second thermal storage unit 208 includes a third liquid pump 284a used to pump the intermediate third fluid 224a from the intermediate storage unit 208a to the seventh heat exchanger 290. The circulation of the intermediate third fluid 224a in heat exchange relationship with the hot liquid $CO_2$ stream 242c results in retrieving a third quantity of first thermal energy from the intermediate third fluid 224a.

The third heat exchanger 228 is coupled to the seventh heat exchanger 290 and the hot storage unit 208b of the second thermal storage unit. 208. The third heat exchanger 228 is disposed downstream relative to the seventh heat exchanger 290 and configured to receive the hot $CO_2$ stream 242d from the seventh heat exchanger 290 and the hot third fluid 224b from the hot storage unit 208b of the second thermal storage unit 208. The third heat exchanger 228 is used to exchange heat between the hot third fluid 224b and the hot $CO_2$ stream 242d, to generate a supercritical $CO_2$ stream 242e and the intermediate third fluid 224a. In the illustrated embodiment, the second thermal storage unit 208 includes a fourth liquid pump 264a used to pump the hot third fluid 224b from the hot storage unit 208b to the third heat exchanger 228. The circulation of the hot third fluid 224b in heat exchange relationship with the hot $CO_2$ stream 242d results in retrieving a second quantity of first thermal energy from the hot third fluid 224b. The intermediate third fluid 224a discharged from the third heat exchanger 228, is stored in the intermediate storage unit 208a.

The first heater 230a is coupled to the third heat exchanger 228 and disposed downstream relative to the third heat exchanger 228. In one embodiment, the first heater 230a is a preheater used to receive the supercritical $CO_2$ stream 242e and a first intermediate exhaust stream 240b from the second heater 230b. The first heater 230a is used to indirectly exchange heat between the supercritical $CO_2$ stream 242e and the first intermediate exhaust stream 240b, to generate a first hot supercritical $CO_2$ stream 242f and a second intermediate exhaust stream 240c. In certain embodiments, the second intermediate exhaust stream 240c is discharged to the third heater 230c of the power system 204.

The recuperator 299 is coupled to the splitter 286 and the combining unit 292. The recuperator 299 is disposed downstream relative to the splitter 286 and upstream relative to the combining unit 292. The recuperator 299 is used to receive the bypass pressurized liquid $CO_2$ stream 246a from the splitter 286 and a second expanded gaseous $CO_2$ stream 242k from the third expander 298. The recuperator 299 is used to exchange heat between the bypass pressurized liquid $CO_2$ stream 246a and the second expanded gaseous $CO_2$ stream 242k, to generate a cooled second expanded gaseous $CO_2$ stream 242l and a hot bypass supercritical $CO_2$ stream 246b.

The combining unit 292 is coupled to the first heater 230a, the recuperator 299, and the second heater 230b. The combining unit 292 is disposed downstream relative to the first heater 230a and the recuperator 299 and upstream relative to the second heater 230b. The combining unit 292 is used to receive the first hot supercritical $CO_2$ stream 242f and the hot bypass supercritical $CO_2$ stream 246b and generate the second hot supercritical $CO_2$ stream 242g. A split channel 286a is coupled to the second heater 230b bypassing the first heater 230a via the combining unit 292.

The second heater 230b is disposed downstream relative to the combining unit 292. The second heater 230b is used to receive the second hot supercritical $CO_2$ stream 242g and a hot exhaust stream 240a from a heat source (not shown). The second heater 230b is used to exchange heat between the second hot supercritical $CO_2$ stream 242g and the hot exhaust stream 240a, to generate a third hot supercritical $CO_2$ stream 242h and the first intermediate exhaust stream 240b. The first intermediate exhaust stream 240b is discharged to first heater 230a. In one embodiment, the hot exhaust stream 240a may be obtained from an engine, a gas burner, an oil burner, waste heat stream, exhaust stream, molten salt stream, a solar heater, and the like. The fourth heat exchanger 230 including the first heater 230a and the second heater 230b is used to provide a second thermal energy to the fourth fluid 242, i.e., to the second hot supercritical $CO_2$ stream 242g, to generate the third hot supercritical $CO_2$ stream 242h.

The second expander 232 is coupled to the second heater 230b and disposed downstream relative to the second heater 230b. The second expander 232 is used to receive the third hot supercritical $CO_2$ stream 242h from the second heater 230b. The second expander 232 is used to expand the third hot supercritical $CO_2$ stream 242h to produce a first expanded gaseous $CO_2$ stream 242i. In one embodiment, the first expanded gaseous $CO_2$ stream 242i has a substantially lower pressure and temperature compared to the third hot supercritical $CO_2$ stream 242h. The second expander 232 is further coupled to the first generator 234a and used to drive the first generator 234a to generate first electric power 244a.

The third heater 230c is coupled to the second expander 232 and the first heater 230a. The third heater 230c is disposed downstream relative to the second expander 232 and used to receive the first expanded gaseous $CO_2$ stream 242i and the second intermediate exhaust stream 240c from the first heater 230a. The third heater 230c is used to exchange heat between the first expanded gaseous $CO_2$ stream 242i and the second intermediate exhaust stream 240c, to generate a fourth hot supercritical $CO_2$ stream 242j and cold exhaust stream 240d. The cold exhaust stream 240d is discharged to atmosphere or an exhaust treatment device (not shown).

The third expander 298 is coupled to the third heater 230c and disposed downstream relative to the third heater 230c. The third expander 298 is used to receive the fourth hot supercritical $CO_2$ stream 242j and expand the fourth hot supercritical $CO_2$ stream 242j to produce the second expanded gaseous $CO_2$ stream 242k. In one embodiment, the second expanded gaseous $CO_2$ stream 242k has a substantially lower pressure and temperature compared to the fourth hot supercritical $CO_2$ stream 242j. The third expander 298 is further coupled to the second generator 234b and used to drive the second generator 234b to generate second electric power 244b.

The first thermal storage unit 206 is used to receive the cooled second expanded gaseous $CO_2$ stream 242l from the recuperator 299. In such an embodiment, the cooled second expanded gaseous $CO_2$ stream 242l is condensed using the solid $CO_2$ stream 220a to produce the liquid $CO_2$ stream 220b. Specifically, the cooled second expanded gaseous $CO_2$ stream 242l is cooled to the triple point of $CO_2$ before condensing in the first thermal storage unit 206, thereby melting the solid portion of the $CO_2$ slush to generate additional solid $CO_2$ stream 220b.

Figure 5:
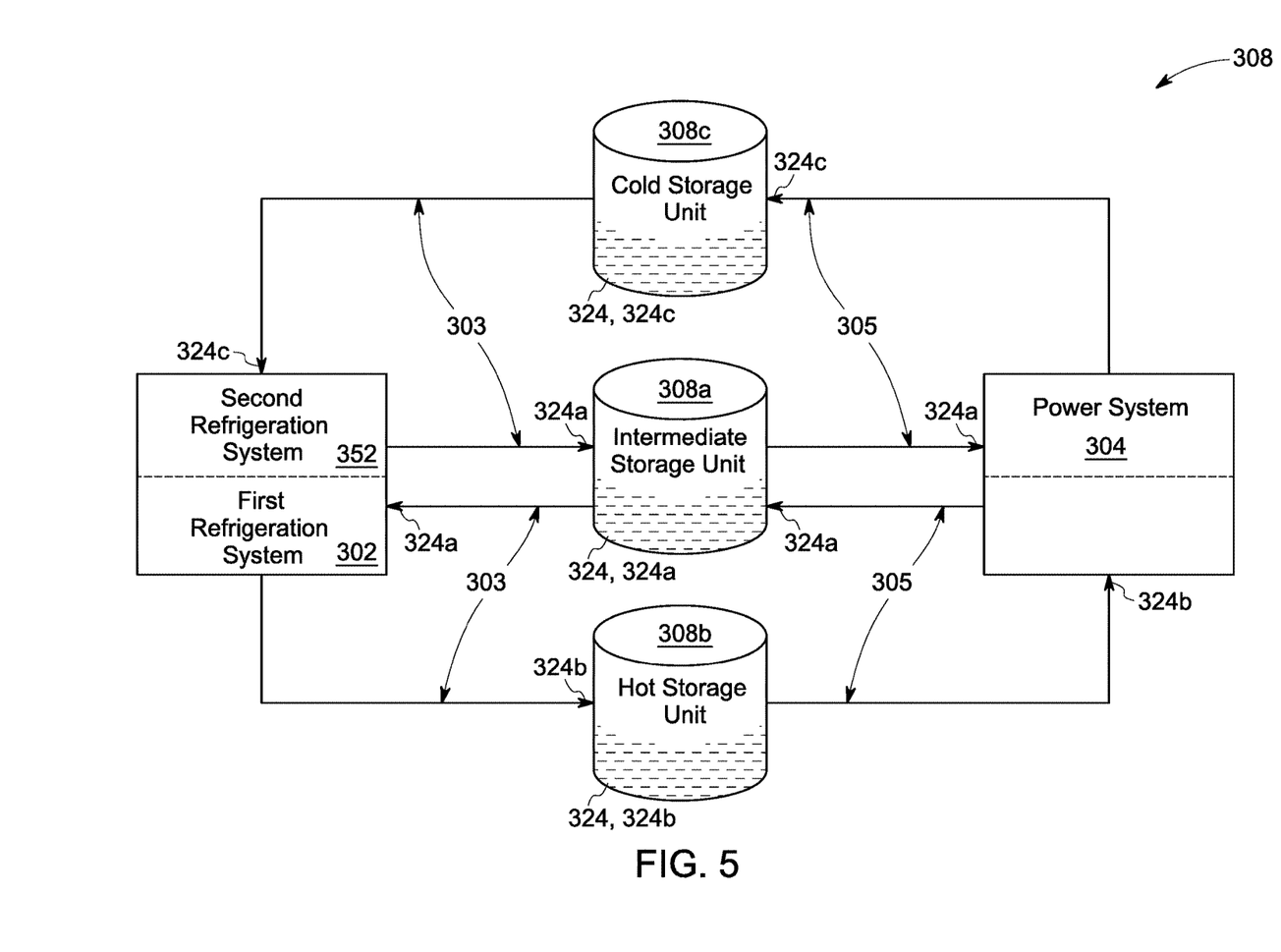
FIG. 5 illustrates a block diagram of a thermal storage unit in accordance with one exemplary embodiment.

FIG. 5 illustrates a block diagram of a thermal storage unit 308 in accordance with one exemplary embodiment. The thermal storage unit 308 is substantially similar to the second thermal storage units 108, 208 discussed with reference to the embodiments of FIGS. 1-4.

The thermal storage unit 308 includes an intermediate storage unit 308a, a hot storage unit 308b, and a cold storage unit 308c. The intermediate storage unit 308a, the hot storage unit 308b, and the cold storage unit 308c are coupled to each other via first circulation paths 303 extending through a first refrigeration system 302 and second refrigeration system 352. Further, the intermediate storage unit 308a, the hot storage unit 308b, and the cold storage unit 308c are coupled to each other via a second circulation path 305 extending through a power system 304. In the illustrated embodiment, the first refrigeration system 302 and the second refrigeration system 352 are coupled to each other. The thermal storage unit 308 is used to circulate a fluid 324 through the first refrigeration system 302, the second refrigeration system 352, and the power system 304. In one embodiment, the fluid 324 is a third fluid as discussed with reference to the embodiments of FIGS. 1-4. In certain embodiments, the fluid 324 is water.

In one embodiment, the cold storage unit 308c is used to store cold fluid 324c. The intermediate storage unit 308a is used to store intermediate fluid 324a. The hot storage unit 308b is used to store hot fluid 324b. In one embodiment, the cold fluid 324c is in a temperature range from about −10 degrees centigrade to about 10 degrees centigrade. The intermediate fluid 324a is in a temperature range from about 10 degrees centigrade to about 30 degrees centigrade. The hot fluid 324b is in a temperature range from about 80 degrees centigrade to about 110 degrees centigrade.

During operation of the first refrigeration system 302 and the second refrigeration system 352, the cold storage unit 308c is used to discharge the cold fluid 324c to the second refrigeration system 352 to extract a quantity of first thermal energy from a fluid (not shown) circulated in the second refrigeration system 352. In certain embodiments, the quantity of the first thermal energy is a third quantity of first thermal energy and the fluid is a fifth fluid as discussed with reference to the embodiments of FIGS. 1-4. The quantity of the first thermal energy is stored in the intermediate fluid 324a. The intermediate fluid 324a is then stored in the intermediate storage unit 308a. Further, the intermediate storage unit 308a is used to discharge the intermediate fluid 324a to the first refrigeration system 302 to extract another quantity of the first thermal energy from a fluid (not shown) circulated in the first refrigeration system 302 and store the other quantity of the first thermal energy in the hot fluid 324b. In certain embodiments, the other quantity of the first thermal energy is a second quantity of first thermal energy and the fluid is a first fluid as discussed with reference to the embodiments of FIGS. 1-4. The hot fluid 324b is then stored in the hot storage unit 308b.

During operation of the power system 304, the hot storage unit 308b is used to discharge the hot fluid 324b to the power system 304 for retrieving the other quantity of the first thermal energy from the hot fluid 324b. The other quantity of first thermal energy is provided to a fluid (not shown) circulated in the power system 304. In certain embodiments, the fluid is a fourth fluid as discussed with reference to the embodiments of FIGS. 1-4. The hot fluid 324b is discharged as the intermediate fluid 324a from the power system 304. The intermediate fluid 324a is then stored in the intermediate storage unit 308a. Further, the intermediate storage unit 308a is used to discharge the intermediate fluid 324a to the power system 304 for retrieving the quantity of the first thermal energy from the intermediate fluid 324a. The quantity of first thermal energy is provided to the fluid circulated in the power system 304. The intermediate fluid 324a is discharged as the cold fluid 324c from the power system 304. The cold fluid 324c is then stored in the cold storage unit 308c.

Figure 6:
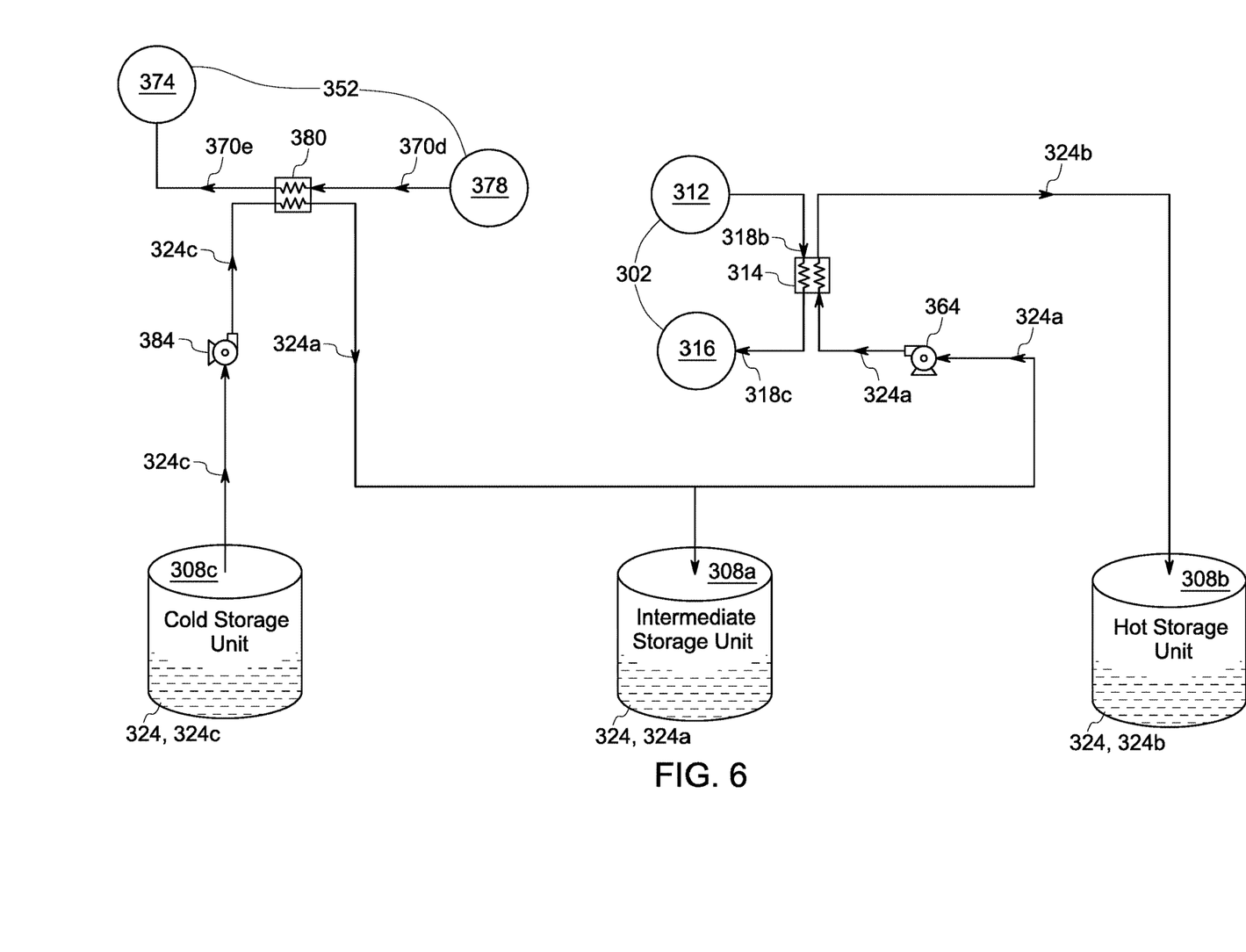
FIG. 6 illustrates a block diagram of a thermal storage unit, a portion of a first refrigeration system, and a portion of a second refrigeration system in accordance with one exemplary embodiment.

FIG. 6 illustrates a block diagram of the thermal storage unit 308, a portion of the first refrigeration system 302, and a portion of the second refrigeration system 352 in accordance with one exemplary embodiment.

During operation of the first refrigeration system 302 a first liquid pump 364 is used to pump the intermediate fluid 324a from the intermediate storage unit 308a to a heat exchanger 314 (also referred to as a "second heat exchanger") of the first refrigeration system 302. In such embodiments, the heat exchanger 314 is further used to receive a compressed gaseous $CO_2$ stream 318b from a first compressor 312 of the first refrigeration system 302. The compressed gaseous $CO_2$ stream 318b is circulated in heat exchange relationship with the intermediate fluid 324a, and thereby produce a cold vapor $CO_2$ stream 318c and the hot fluid 324b. In such embodiments, the intermediate fluid 324a is used to extract another quantity of first thermal energy from the compressed gaseous $CO_2$ stream 318b and store the other quantity of the first thermal energy in the hot fluid 324b. Further, the cold vapor $CO_2$ stream 318c is discharged from the heat exchanger 314 to an expander 316 (also referred to as a "first expander") of the first refrigeration system 302. The hot fluid 324b is then stored in the hot storage unit 308b.

During operation of the second refrigeration system 352, a second liquid pump 384 is used to pump the cold fluid 324c from the cold storage unit 308c to a heat exchanger 380 (also referred to as a "sixth heat exchanger") of the second refrigeration system 352. The heat exchanger 380 is further used to receive a cool liquid propane stream 370d from an air condenser 378 of the second refrigeration system 352. The cool liquid propane stream 370d is circulated in heat exchange relationship with the cold fluid 324c, and thereby produce a cold liquid propane stream 370e and the intermediate fluid 324a. In such embodiments, the cold fluid 324c is used to extract a quantity of first thermal energy from the cool liquid propane stream 370d and store the quantity of the first thermal energy in the intermediate fluid 324a. Further, the cold liquid propane stream 370e is discharged from the heat exchanger 380 to a recuperator 374 of the second refrigeration system 352. The intermediate fluid 324a is then stored in the intermediate storage unit 308a.

Figure 7:
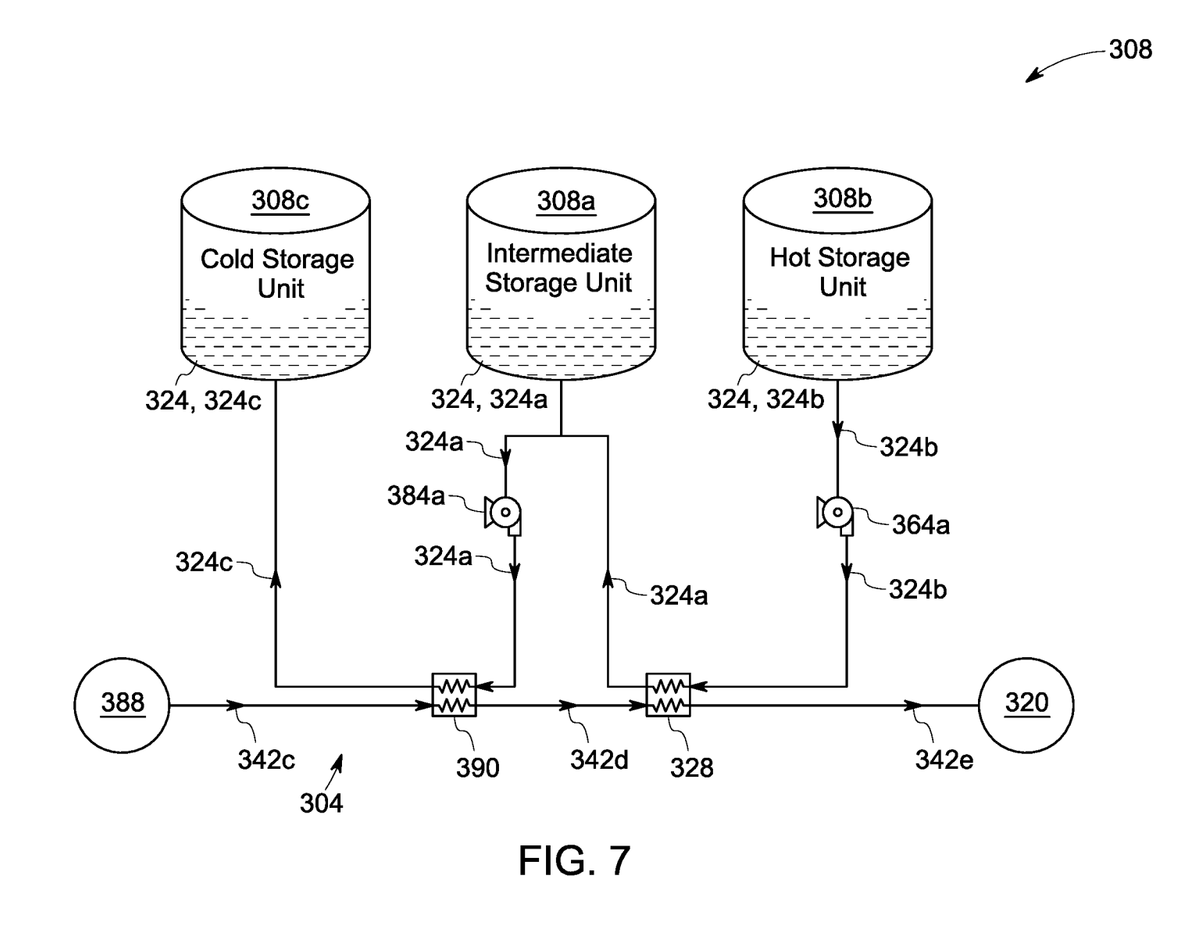
FIG. 7 illustrates a block diagram of a thermal storage unit and a portion of a power system in accordance with one exemplary embodiment.

FIG. 7 illustrates a block diagram of the thermal storage unit 308 and the power system 304 in accordance with one exemplary embodiment. During operation of the power system 304, a liquid pump 364a (also referred to as a fourth liquid pump") is used to pump the hot fluid 324b from the hot storage unit 308b to a heat exchanger 328 (also referred to as a "third heat exchanger") of the power system 304. The heat exchanger 328 is further used to receive a hot $CO_2$ stream 342d from a heat exchanger 390 (also referred to as a "seventh heat exchanger") of the power system 304. The heat exchanger 328 is used to circulate a hot $CO_2$ stream 342d in heat exchange relationship with the hot fluid 324b, and thereby produce a supercritical $CO_2$ stream 342e and the intermediate fluid 324a. In such embodiments, the hot fluid 324b is used to provide the other quantity of first thermal energy to the heat exchanger 328 to produce the supercritical $CO_2$ stream 342e. Further, the supercritical $CO_2$ stream 342e is discharged from the heat exchanger 328 to a heat exchanger 320 (also referred to as a "fourth heat exchanger") of the power system 304. The intermediate fluid 324a produced in the heat exchanger 328 is then stored in the intermediate storage unit 308a.

Further, a liquid pump 384a (also referred to as a "third liquid pump") is used to pump the intermediate fluid 324a from the intermediate storage unit 308a to the heat exchanger 390. In such an embodiment, the heat exchanger 390 is further used to receive a hot liquid $CO_2$ stream 342c from an air cooler 388 of the power system 304. The hot liquid $CO_2$ stream 342c is circulated in heat exchange relationship with the intermediate fluid 324a, and thereby produce the hot $CO_2$ stream 342d and the cold fluid 324c. In such embodiments, the intermediate fluid 324a is used to provide the quantity of first thermal energy to the hot liquid $CO_2$ stream 342c to produce the hot $CO_2$ stream 342d. Further, the hot $CO_2$ stream 342d is discharged from the heat exchanger 390 to the heat exchanger 328. The cold fluid 324c produced in the heat exchanger 390 is then stored in the cold storage unit 308c.

In accordance with certain embodiments discussed herein, a second thermal storage unit is used to circulate cold fluid in a second refrigeration system and intermediate fluid in a first refrigeration system to store first thermal energy generated in the first and second refrigeration systems, thereby improving efficiency of the first and second refrigeration systems. The second thermal storage unit is used to circulate the hot and intermediate fluids in heat exchange relationship to provide the first thermal energy to the power system, thereby improving efficiency of the power system.

While only certain features of embodiments have been illustrated and described herein, many modifications and changes will occur to those skilled in the art. It is, therefore, to be understood that the appended embodiments are intended to cover all such modifications and changes as falling within the spirit of the disclosed technique.

The invention claimed is:

1. A thermoelectric energy storage system comprising:
a first refrigeration system comprising a first heat exchanger, a first compressor, a second heat exchanger, and a first expander, wherein the first heat exchanger is disposed upstream relative to the first compressor and downstream relative to the first expander, and wherein the second heat exchanger is disposed downstream relative to the first compressor and upstream relative to the first expander;
a power system comprising a third heat exchanger, a second compressor, a fourth heat exchanger, a fifth heat exchanger, and a second expander, wherein the third heat exchanger is disposed downstream relative to the second compressor and upstream relative to the fourth heat exchanger, wherein the fourth heat exchanger is disposed upstream relative to the second expander and coupled to a heat source, and wherein the fifth heat exchanger is disposed downstream relative to the second expander and upstream relative to the second compressor;
a first thermal storage tank coupled to the first heat exchanger and the fifth heat exchanger; and
a second thermal storage unit coupled to the first refrigeration system and the power system, wherein the second thermal storage unit comprises at least one of a hot storage tank, an intermediate tank, and a cold storage tank.

2. The thermoelectric energy storage system of claim 1, wherein the first thermal storage tank and the first heat exchanger are integrated to each other.

3. The thermoelectric energy storage system of claim 1, wherein the first thermal storage tank and the fifth heat exchanger are integrated to each other.

4. The thermoelectric energy storage system of claim 1, wherein the second thermal storage unit comprises the hot storage tank, the intermediate storage tank, and the cold storage tank, wherein the hot storage tank and the intermediate storage tank are coupled to one another via a first circulation path extending through the first refrigeration system, and wherein the hot storage tank, the intermediate storage tank, and the cold storage tank are further coupled to one another via a second circulation path extending through the power system.

5. The thermoelectric energy storage system of claim 1, further comprising a second refrigeration system coupled to the first refrigeration system and the second thermal storage unit.

6. The thermoelectric energy storage system of claim 5, wherein the second thermal storage unit comprises the hot storage tank, the intermediate storage tank, and the cold storage tank, coupled to each other via a first circulation path extending through the first refrigeration system and second refrigeration system, and wherein the hot storage tank, the intermediate storage tank, and the cold storage tank are further coupled to each other via a second circulation path extending through the power system.

7. The thermoelectric energy storage system of claim 1, wherein the power system further comprises a split channel extending from the second compressor to the fourth heat exchanger bypassing the third heat exchanger.

8. The thermoelectric energy storage system of claim 7, wherein the fourth heat exchanger comprises a first heater and a second heater disposed downstream relative to the first heater, wherein the split channel is coupled to the second heater bypassing the first heater.

9. The thermoelectric energy storage system of claim 8, wherein the power system further comprises:
a third heater disposed downstream relative to the second expander; and
a third expander disposed downstream relative to the third heater and upstream relative to the fifth heat exchanger.

10. A thermoelectric energy storage system comprising:
a first refrigeration system;
a second refrigeration system;
a thermal storage comprising a cold storage tank, an intermediate storage tank, and a hot storage tank, wherein the cold storage tank, the intermediate storage tank, and the hot storage tank are coupled to each other via first circulation paths extending through the first refrigeration system and the second refrigeration system; and a power system, wherein the hot storage tank, the intermediate storage tank, and the cold storage tank are coupled to each other via a second circulation path extending through the power system.

11. A method comprising:

circulating a first fluid in a first refrigeration system to generate first thermal energy;

circulating a second fluid from a first thermal storage tank in heat exchange relationship with the first fluid to store a first quantity of the first thermal energy in the second fluid;

circulating a third fluid from a second thermal storage unit in heat exchange relationship with the first fluid to store a second quantity of the first thermal energy in the third fluid, the second thermal storage unit including at least one of a hot storage tank, an intermediate tank, and a cold storage tank;

circulating a fourth fluid in a power system;

circulating the second fluid from the first thermal storage tank in heat exchange relationship with the fourth fluid circulated in the power system, to retrieve the first quantity of the first thermal energy stored in the second fluid;

circulating the third fluid from the second thermal storage unit in heat exchange relationship with the fourth fluid circulated in the power system, to retrieve the second quantity of the first thermal energy stored in the third fluid;

providing second thermal energy to the fourth fluid circulated in the power system, using a heat source, to increase temperature of the fourth fluid; and expanding the fourth fluid in the power system for generating electric power.

12. The method of claim 11, wherein circulating the third fluid from the second thermal storage unit in heat exchange relationship with the first fluid comprises circulating the third fluid from the intermediate storage tank of the second thermal storage unit in heat exchange relationship with the first fluid to store the second quantity of the first thermal energy in the third fluid in the hot storage tank of the second thermal storage unit.

13. The method of claim 12, further comprising circulating a fifth fluid in a second refrigeration system in heat exchange relationship with the first fluid circulated in the first refrigeration system to transfer a third quantity of the first thermal energy of the fifth fluid.

14. The method of claim 13, wherein circulating the fifth fluid in the second refrigeration system further comprises circulating the third fluid from the cold storage tank of the second thermal storage unit in heat exchange relationship with the fifth fluid to store the third quantity of the first thermal energy of the third fluid in the intermediate storage tank.

15. The method of claim 14, wherein circulating the third fluid from the second thermal storage unit in heat exchange relationship with the fourth fluid comprises circulating the third fluid from the hot storage tank in heat exchange relationship with the fourth fluid to retrieve the second quantity of the first thermal energy stored in the third fluid, in the intermediate storage tank.

16. The method of claim 15, wherein circulating the third fluid from the second thermal storage unit in heat exchange relationship with the fourth fluid further comprises circulating the third fluid from the intermediate storage tank in heat exchange relationship with the fourth fluid to retrieve the third quantity of the first thermal energy stored in the third fluid, in the cold storage tank.

17. The method of claim 11, wherein circulating the third fluid from the second thermal storage unit in heat exchange relationship with the fourth fluid comprises directing a portion of the fourth fluid bypassing at least one heat exchanger disposed downstream of a compressor of the power system and coupled to the second thermal storage unit.

18. The method of claim 11, wherein providing the second thermal energy to the fourth fluid comprises supplying the second thermal energy from the heat source to the fourth fluid upstream of an expander of the power system.

19. The method of claim 11, wherein circulating the first fluid in the first refrigeration system and the fourth fluid in the power system are performed alternately.

20. The method of claim 11, further comprising:

providing third thermal energy to an expanded fourth fluid in the power system to increase temperature of the expanded fourth fluid; and expanding the expanded fourth fluid in the power system for further generating electric power.

* * * * *